DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 1, 1975

936 O.G. 7

T936,002
HYDROXYL-TERMINATED CHLOROPRENE POLYMERS

James T. Hill, 509 Rienzi Drive, La Place, La. 70068

Filed Mar. 18, 1974, Ser. No. 452,336
Int. Cl. C08g *22/08*
U.S. Cl. 260—77.5 CR
No Drawing. 11 Pages Specification

Hydroxyl-terminated chloroprene polymers, suitable as starting materials for the preparation of self-extinguishing polyurethanes, are made by hydrolyzing xanthate-terminated chloroprene polymers to mercaptan-terminated polymers, then contacting those with a hydroxy-alkyl acrylate or methacrylate. The polymers can be represented by the following formula $$(HO-A-O-\overset{\overset{\displaystyle O}{\|}}{C}-\overset{\overset{\displaystyle R}{|}}{C}H-CH_2-S)_nX,$$

wherein A is a $C_2$–$C_6$ alkylene radical; R is hydrogen or methyl; *n* has an average value of 2 to 4; and X is a polymer fragment, which is either a homopolymer of chloroprene or a copolymer of chloroprene with up to equimolar amount of a coplymerizable monomer.